Oct. 16, 1945.   J. C. BELL   2,387,050
DYNAMO-ELECTRIC MACHINE
Filed July 14, 1942

Inventor:
Julius C. Bell,
by Harry E. Dunham
His Attorney.

Patented Oct. 16, 1945

2,387,050

UNITED STATES PATENT OFFICE 2,387,050

DYNAMOELECTRIC MACHINE

Julius C. Bell, Swampscott, Mass., assignor to General Electric Company, a corporation of New York Application July 14, 1942, Serial No. 450,859

3 Claims. (Cl. 192—105)

My invention relates to improvements in dynamo-electric machines and more particularly to an improved rotatable member of such a machine provided with a coupling for connecting the rotatable member to a driven shaft.

An object of my invention is to provide a dynamo-electric machine having an improved rotatable member and coupling construction.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
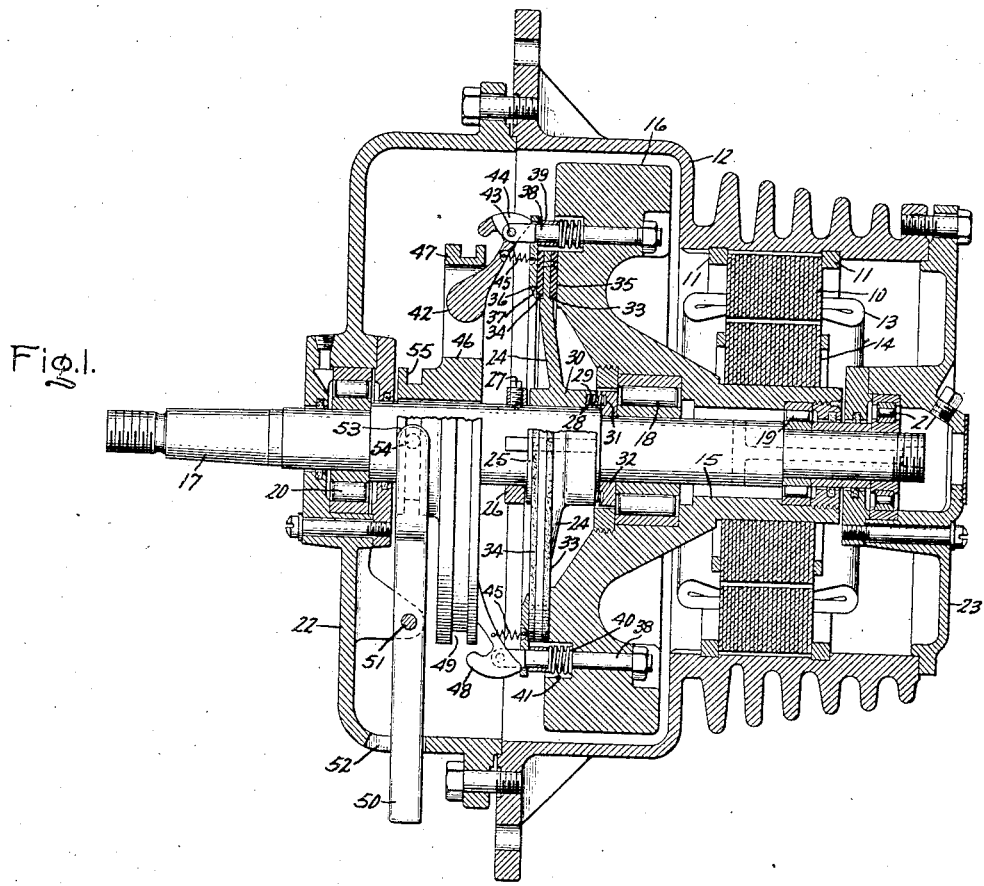
Figure 2:
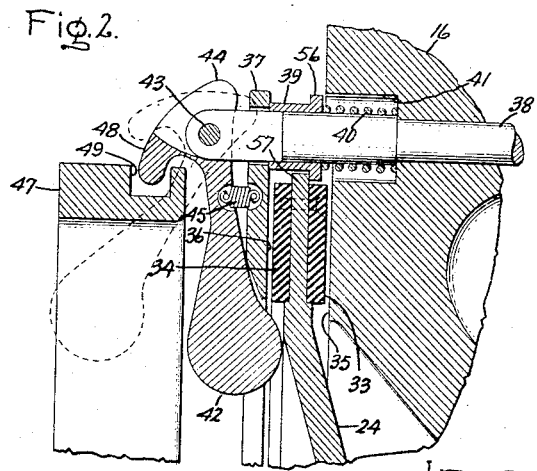

In the drawing Fig. 1 is a sectional side elevational view of a dynamo-electric machine provided with an embodiment of my invention, and Fig. 2 is a sectional partial view of a modification of the construction shown in Fig. 1.

Referring to the drawing I have shown a dynamo-electric machine having a stationary member provided with a laminated core 10 of magnetic material mounted between end rings 11 in a supporting housing 12. The stationary member 10 is provided with an exciting winding 13 which is adapted to provide the required electromagnetic excitation for driving a rotatable member including a laminated core 14 of magnetic material. This core 14 is mounted on a sleeve or tubular portion 15 of the rotatable member which is formed integral with a relatively large weighted flywheel 16. This entire rotatable member is rotatably mounted about a shaft 17 and is rotatably supported by roller bearings 18 and 19 on the shaft 17. The shaft 17 is rotatably supported on the stationary member of the machine by roller bearings 20 and 21 which are mounted in bearing housings formed in end shields 22 and 23, respectively, secured to the stationary member housing 12. In such a construction the rotatable member of the motor is adapted to rotate freely when the weights 42 are in the position shown in Fig. 2. In order to obtain this operation, a coupling is provided which includes a friction clutch disk member 24 slidably mounted on the shaft 17 and secured thereto against rotation by a key and keyway 25. A stop ring 26 is secured by a set screw 27 on the shaft 17 to limit the outward axial movement of the clutch disk 24. A plurality of coil springs 28 is arranged in pockets 29 formed in the clutch disk hub 30, and these springs extend into pockets 31 formed in a ring 32 mounted on the shaft 17 so as to bias the friction clutch member disk 24 axially away from the ring 32. In order to provide a driving connection between the shaft 17 and the rotatable member of the motor, the friction clutch member 24 is provided with friction surface members 33 and 34 secured to the outer periphery thereof and arranged to engage complementary clutching surfaces 35 and 36 on the flywheel 16 and on a clutch ring 37, respectively. The clutch ring 37 is slidably mounted on a plurality of pins 38 secured to the rotatable member flywheel 16 for rotation therewith and is biased away from the friction clutch disk 24 out of engagement with the friction driving surface 34 by an axially slidable collar 39 mounted on each of the pins 38 and biased outwardly by a coil spring 40 mounted about the pin 38 in a pocket 41 formed in the flywheel 16. A plurality of centrifugal operating members is mounted on the pins 38 and includes centrifugal weights 42 pivotally mounted on the ends of the pins 38 by pivot pins 43 and provided with operating fingers 44 adapted to engage the clutch ring 37 for biasing this ring into engagement with the friction disk surface 34. These operating members are normally biased inwardly out of engagement with the clutch ring 37 by tension coil springs 45 secured to the weights 42 and to the ring 37 such that the weights 42 will remain in their inward position below a predetermined speed of rotation of the rotatable member of the motor. Thus, the rotatable member of the motor will operate freely without driving the shaft 17 below a predetermined speed of operation, as the springs 40 will bias the coupling ring 37 out of contact with the friction surface 34 of the clutch disk 24 and the springs 28 will bias the friction surface 33 of the clutch disk 24 out of engagement with the friction surface 35 of the flywheel 16, thereby completely disengaging the clutch disk 24 from the rotatable member of the motor. Since the centers of gravity of the weights 42 are inward of the pins 43, rotation will not cause the weights to fly out and connection of the rotatable member to the shaft 17 may be obtained when the rotatable member attains a predetermined speed by moving a ring 47 arranged to engage fingers 48 in a groove 49 in the ring so as to bias the fingers 48 outwardly to move the centers of the weights 48 outwardly past the pins 43. From this position the centrifugal weights 42 will move outwardly against the restraining biasing force of the springs 45, and the fingers 44 of the centrifugal operating members will press the clutch ring 37 into engagement with the friction surface 34 of the clutch disk 24 and will bias the friction surface 33 of the clutch disk 24 into engagement with the friction surface 35 of the flywheel 16 to provide a driving connection between the rotatable member of the motor and the shaft 17. Disconnection of the rotatable member of the motor from the shaft 17 to prevent the operation of the centrifugal operating mechanism of the coupling is obtained by mounting the collar 46 axially movable on the shaft 17 and arranging the ring 47 to engage the centrifugal weights 42 for biasing them to their inward position, thereby disengaging the friction surfaces of the clutch disk 24 with the corresponding friction surfaces of the rotatable member of the motor. The centrifugal operating members are locked in their inward position by the engagement of fingers 48 with the sides of the groove 49 in the ring 47. Operation of this uncoupling device is obtained by a manually operable lever 50 which is pivotally secured to the stationary member end shield 22 by a pivot pin 51 and extends to the exterior thereof through an opening 52. This operating lever is provided with a bifurcated end 53 provided with a conventional sliding pin coupling 54 arranged in engagement with a groove 55 formed in the axially slidable collar 46 to provide for biasing the collar 46 axially toward and away from the friction clutch disk 24. In order to provide against damage to the coupling mechanism, it is entirely enclosed by the stationary member housing 12 and the end shield 22.

In Fig. 2 is shown a modification of the arrangement shown in Fig. 1, wherein the friction clutch disk 24 is biased out of engagement with the friction surface 35 of the flywheel 16 by a shoulder 56 formed on the slidable collar 39. The shoulder 56 projects into engagement with the end of the friction clutch disk 24 and when the centrifugal weights 42 are in their inward position as shown in this figure, their coil springs 40 bias the collar 39 outwardly such that the outer end of the collar 39 engages the coupling ring 37 before the shoulder 56 engages the end 57 of the clutch disk 24. This biases the friction surface 36 of the clutch ring 37 out of engagement with the friction surface 34 of the clutch disk 24 and subsequently biases the friction surface 33 out of engagement with the friction surface 35 of the flywheel 16. The remainder of the construction of this machine may be substantially the same as that shown in Fig. 1.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. In a dynamo-electric machine having a stationary member and a shaft rotatably supported on said stationary member and a rotatable member supported on and rotatably mounted about said shaft, means including a coupling including a plurality of clutch members and pivotally mounted centrifugal operating members having a cam surface formed on one end thereof arranged to actuate said clutch members for interconnecting said rotatable member and said shaft only on said rotatable member attaining a predetermined speed, means for biasing said centrifugal operating members inwardly around said pivotal mountings with the center of gravity thereof biased axially inwardly of said pivotal mountings for placing said centrifugal operating members in inoperative positions, one of said coupling clutch members being secured to said rotatable member and another being secured to said shaft, surfaces on said coupling clutch members arranged to engage one another frictionally, means for resiliently biasing apart said friction coupling members to disengaged positions when said centrifugal operating members are in inoperative positions, and means including a locking ring for moving and locking said centrifugal operating members in inoperative positions to provide for disengagement of said friction coupling members and arranged for moving said centrifugal operating members to operative positions with the center of gravity of said centrifugal operating members axially outwardly of said pivotal mountings.

2. In a dynamo-electric machine having a stationary member and a shaft rotatably supported on said stationary member and a rotatable member supported on and rotatably mounted about said shaft, means including a coupling including a plurality of clutch members and pivotally mounted centrifugal operating members having a cam surface formed on one end thereof arranged to actuate said clutch members for interconnecting said rotatable member and said shaft only on said rotatable member attaining a predetermined speed, one of said coupling clutch members being secured to said rotatable member and another being secured to said shaft, surfaces on said coupling clutch members arranged to engage one another frictionally, resilient means for biasing said centrifugal operating member into inoperative positions below a predetermined speed, means including a locking ring for moving said centrifugal operating members out of inoperative positions and also for moving and locking said centrifugal operating members in inoperative positions, and means for biasing apart said friction coupling members to disengaged positions when said centrifugal operating members are in inoperative positions.

3. In a dynamo-electric machine having a stationary member and a shaft rotatably supported on said stationary member and a rotatable member supported on and rotatably mounted about said shaft, means including a coupling including two clutch members and pivotally mounted centrifugal operating members having a cam surface formed on one end thereof arranged to actuate said clutch members for interconnecting said rotatable member and said shaft, one of said coupling clutch members being secured to said rotatable member and the other being secured to said shaft within said stationary member, surfaces on said coupling clutch members arranged to engage one another frictionally, means including a non-rotatable handle extending through said stationary member and a locking ring operatively connected thereto for moving and locking said centrifugal operating members in inoperative positions, resilient means for biasing said centrifugal operating members to inoperative positions below a predetermined speed, and means for biasing apart said friction coupling members to disengaged positions when said centrifugal operating members are in inoperative positions.

JULIUS C. BELL.